US011840457B1

(12) United States Patent
Wonder

(10) Patent No.: US 11,840,457 B1
(45) Date of Patent: Dec. 12, 2023

(54) SYSTEM AND METHOD FOR PRODUCTION OF ALUMINUM CHLORIDE DERIVATIVES

(71) Applicant: USALCO, LLC, Baltimore, MD (US)

(72) Inventor: Bruce Wonder, Joppa, MD (US)

(73) Assignee: USALCO, LLC, Baltimore, MD (US)

( * ) Notice: Subject to any disclaimer, the term of this patent is extended or adjusted under 35 U.S.C. 154(b) by 409 days.

(21) Appl. No.: 17/179,092

(22) Filed: Feb. 18, 2021

Related U.S. Application Data

(60) Provisional application No. 62/979,094, filed on Feb. 20, 2020.

(51) Int. Cl.
| | |
|---|---|
| C01F 7/00 | (2022.01) |
| B01J 19/00 | (2006.01) |
| B01J 19/06 | (2006.01) |
| B01J 19/22 | (2006.01) |
| C01F 7/786 | (2022.01) |

(52) U.S. Cl.
CPC ........... *C01F 7/786* (2022.01); *B01J 19/0013* (2013.01); *B01J 19/06* (2013.01); *B01J 19/22* (2013.01); *B01J 2219/00157* (2013.01)

(58) Field of Classification Search
CPC ... C01F 7/786; C01F 7/56; B01J 19/06; B01J 19/0013; B01J 19/22; B01J 2219/00157; B01J 2219/00121
See application file for complete search history.

(56) References Cited

U.S. PATENT DOCUMENTS

| | | | |
|---|---|---|---|
| 2,470,315 A | 5/1949 | McGehee | 241/54 |
| 2,671,009 A | 3/1954 | Comstock | 23/90 |
| 3,462,086 A | 8/1969 | Bertrand et al. | 241/5 |
| 3,876,758 A | 4/1975 | Beekman | 424/47 |
| 3,878,293 A | 4/1975 | Piccolo et al. | 423/495 |
| 3,891,745 A | 6/1975 | Bellan et al. | 423/462 |
| 3,953,584 A | 4/1976 | Danner et al. | 423/462 |
| 4,029,750 A | 6/1977 | Schoener et al. | 423/495 |
| 4,090,916 A | 5/1978 | Papafingos et al. | 159/9 A |
| 4,203,812 A | 5/1980 | Bergner et al. | 204/94 |
| 4,259,311 A | 3/1981 | Shah | 423/625 |
| 4,390,131 A | 6/1983 | Pickrel | 241/1 |
| 5,167,372 A | 12/1992 | Poggie et al. | 241/23 |
| 5,573,582 A | 11/1996 | Inui et al. | 106/287.17 |
| 5,985,234 A | 11/1999 | Dulko | 423/467 |
| 5,997,838 A | 12/1999 | Dulko | 423/462 |
| 6,036,935 A | 3/2000 | Dulko | 423/462 |
| 6,145,765 A | 11/2000 | Capelle, Jr. et al. | 241/5 |
| 6,152,974 A | 11/2000 | Delpiano et al. | 44/593 |
| 9,611,155 B2 | 4/2017 | Dulko | C02F 1/5236 |
| 9,878,918 B2 | 1/2018 | Wonder | C01F 7/56 |
| 10,040,072 B2 | 8/2018 | Wonder | B03B 5/56 |
| 10,947,124 B2 | 3/2021 | Dulko et al. | C01F 7/56 |
| 11,634,338 B1* | 4/2023 | Wonder | B01J 2/02 |
| | | | 423/495 |
| 2004/0040178 A1 | 3/2004 | Coles et al. | 34/591 |
| 2007/0187256 A1 | 8/2007 | Pratt et al. | 205/508 |
| 2008/0181840 A1 | 7/2008 | Steelhammer et al. | 423/495 |
| 2014/0007455 A1 | 1/2014 | Backlund | 34/386 |
| 2015/0021514 A1 | 1/2015 | Dulko | 252/175 |
| 2016/0074873 A1* | 3/2016 | Wonder | B03B 5/56 |
| | | | 428/402 |
| 2018/0290895 A1* | 10/2018 | Dulko | C01F 7/57 |

FOREIGN PATENT DOCUMENTS

| | | | | |
|---|---|---|---|---|
| CN | 102607248 A | 7/2012 | | F26B 17/10 |
| DE | 273824 A1 | 11/1989 | | C01F 7/30 |
| EP | 0530598 A1 | 3/1993 | | C01F 7/56 |
| GB | 576557 A | 4/1946 | | |
| GB | 1266328 A | 3/1972 | | B02C 21/00 |
| GB | 1568831 | 6/1980 | | C01F 7/48 |
| WO | WO 90/08738 A1 | 8/1990 | | C01F 7/56 |
| WO | WO 01/97768 A2 | 12/2001 | | A61K 7/34 |
| WO | WO 2007/082122 | 7/2007 | | |

OTHER PUBLICATIONS

Arvaniti et al., "Determination of particle size, surface area, and shape of supplementary cementitious materials by different techniques," Material and Structures, 15 pages, Oct. 4, 2014.

Frías et al., "Determination of Specific Surface Area by the Laser Diffraction Technique. Comparison with the Blaine Permeability Method," Cement and Concrete Research, vol. 21, No. 5, pp. 709-717, 1991.

Harrigan, "Measuring Cement Particle Size and Surface Area by Laser Diffraction," Research Results Digest 382, National Cooperative Highway Research Program, Transportation Research Board of the National Academies, 24 pages, Apr. 2013.

Horiba Instruments, Inc., A Guidebook to Particle Size Analysis, Horiba Scientific, 32 pages, 2012.

ISO, Particle size analysis—Laser diffraction methods, International Standard, ISO 13320, 57 pages, 2009.

Malvern Instruments Limited, A basic guide to particle characterization, Whitepaper, Malvern, 24 pages, 2015.

Malvern Instruments Limited, Mastersizer 3000, User Manual, Malvern, MAN474-06-EN-00, 196 pages, Jun. 2015.

(Continued)

*Primary Examiner* — Timothy C Vanoy
(74) *Attorney, Agent, or Firm* — BURNS & LEVINSON LLP

(57) ABSTRACT

A system for producing particles of aluminum chlorohydrate includes a feed stream configured to have a liquid solution of aluminum chloride, a conveyor belt having a surface configured to hold the liquid solution, a first radiant heat source configured to heat the liquid solution on the surface in order to form solid aluminum chloride hexahydrate, a grinder configured to crush the solid aluminum chloride hexahydrate in order to reduce an overall particle size of the aluminum chloride hexahydrate, and a second radiant heat source configured to heat the aluminum chloride hexahydrate in order to decompose the aluminum chloride hexahydrate and produce the particles of aluminum chlorohydrate. Methods of producing particles of aluminum chlorohydrate are also disclosed.

15 Claims, 6 Drawing Sheets

(56) References Cited

OTHER PUBLICATIONS

Malvern Instruments Limited, Mastersizer 3000, Smarter Particle Sizing, Malvern, 20 pages.

Tzoupanos et al., "Coagulation-flocculation processes in water/wastewater treatment: the application of new generation of chemical reagents," 6th IASME/WSEAS International Conference on Heat Transfer, Thermal Engineering and Environment, Rhodes, Greece, pp. 309-317, Aug. 20-22, 2008.

Yang et al., Characteristics of High-purity Polyaluminum Chloride Species Prepared by Homogenous Alkalization, Natural Science Journal of Xiangtan University, vol. 27, No. 4, pp. 68-72, Jan. 1, 2005 (In Chinese).

Yang et al., Characteristics of High-purity Polyaluminum Chloride Species Prepared by Homogenous Alkalization, Natural Science Journal of Xiangtan University, vol. 27, No. 4, 4 pages, 2005 (English Abstract).

International Searching Authority, International Search Report—International Application No. PCT/US2015/049839, dated May 30, 2016, together with the Written Opinion of the International Searching Authority, 24 pages.

Hartman et al., "Thermal Decomposition of Aluminum Chloride Hexahydrate", Ind. Eng. Chem Res., Jul. 2005, 44, 6591-6598.

Fisher Scientific, Aluminum Chloride Hexahydrate—Description, 2008, 2 pages.

CONTEC, Commercial Brochure, Polyaluminum Chloride, 4 pages, printed in 2016 (Year: 2016).

Park et al., "Bench-scale decomposition of aluminum chloride hexahydrate to produce poly(aluminum chloride)", Ind. Eng. Chem. Res. 2000, 39, 4173-4177 (Year: 2000).

Nair & Narayanan, Microfines disk centrifuge pneumatic classifier for fluid energy-based communication systems:, Adv. Powder Technol., vol. 10, No. 2, 145-157 (1999) (Year: 1999).

International Searching Authority, International Preliminary Report on Patentability—International Application No. PCT/US2015/049839 dated Jan. 30, 2017, 27 pages.

International Searching Authority, International Search Report—International Application No. PCT/US2018/032276 dated Jul. 24, 2018, 14 pages.

Perry et al., Excerpt from Chemical Engineers' Handbook, Fifth Edition, 1973, 8 pages.

\* cited by examiner

Liquid Aluminum Chloride

Dry Aluminum Chloride Hexahydrate with irregular surface

Dry Aluminum Chloride Hexahydrate with flattened surface

Final dry Product

SYSTEM AND METHOD FOR PRODUCTION OF ALUMINUM CHLORIDE DERIVATIVES

CROSS-REFERENCE TO RELATED APPLICATIONS

This patent application claims the benefit of U.S. Provisional Patent Appl. No. 62/979,094 filed Feb. 20, 2020, the disclosure of which is incorporated by reference herein in its entirety.

TECHNICAL FIELD

The present invention relates to the production of aluminum chloride derivatives, and more particularly to the production of aluminum chlorohydrate from aluminum chloride.

BACKGROUND ART

In the manufacture of aluminum chlorohydrate there are two basic approaches, the first, and more traditional, is to add aluminum molecules to a chloride source in an aqueous environment where water also becomes part of the reaction. In this case refined aluminum is used as the source of the aluminum atoms added to form the chlorohydrate species.

The second approach to manufacturing chlorohydrate is the opposite of the traditional method where rather than adding aluminum to chloride, the reaction is carried out by removing chlorine atoms. In this case, an aluminum bearing ore (bauxite), refined bauxite, or aluminum trihydrate, or other forms of aluminum that can be solubilized in a chloride environment (including the refined aluminum used in the traditional method) are dissolved to form an aluminum chloride solution. This solution when concentrated beyond saturation will produce aluminum chloride hexahydrate crystals.

These hexahydrate crystals, when exposed to energy that elevates the temperature of the crystal, will decompose, releasing hydrochloric acid and water. In this decomposition reaction, as the chlorine atom leaves the crystal, it strips one of the hydrogens from one of the waters of hydration associated with the crystal. This leaves a free hydroxyl group to replace the leaving chlorine atom so that the charge of the molecule being formed remains balanced. The result is an increasing basicity molecule.

Problems associated with this process include that when energy enters the crystal it does so from the exterior, so that when the decomposition occurs, a porous insulating layer forms on the surface of the hexahydrate crystal, protecting the crystal and increasing the energy required for decomposition. Additionally, as each chloride leaves the crystal, a higher level of energy (temperature) is required to remove the next chloride from the molecule.

Novel processes for producing aluminum chlorohydrate particles without the problems discussed above are needed.

SUMMARY OF THE EMBODIMENTS

In accordance with one embodiment of the invention, a method for producing particles of aluminum chlorohydrate includes providing a liquid solution of aluminum chloride onto a surface, heating the liquid solution with a first radiant heat source in order to dry the aluminum chloride, so that solid aluminum chloride hexahydrate is formed, crushing the solid aluminum chloride hexahydrate in order to reduce an overall particle size of the aluminum chloride hexahydrate, and heating the aluminum chloride hexahydrate with a second radiate heat source in order to decompose the aluminum chloride hexahydrate to produce the particles of aluminum chlorohydrate.

In related embodiments, the liquid solution may be provided by spraying the liquid solution onto a conveyor belt. The first radiant heat source and/or the second radiant heat source may include one or more burners provided above and/or below the surface. The first radiant heat source and/or the second radiant heat source may be provided about 5 inches to about 5.875 inches from the surface. The first radiant heat source and/or the second radiant heat source may heat the surface. The first radiant heat source and the second radiant heat source may be the same heat source. The method may further include collecting gas emitted from the heated liquid solution and/or the heated aluminum chloride hexahydrate. The gas may include steam and/or hydrochloric acid released from the heated solution and/or the heated aluminum chloride hexahydrate. The method may further include collecting heat emitted from the heated solution and/or the heated aluminum chloride hexahydrate in order to recover the heat.

In accordance with another embodiment of the invention, particles of aluminum chlorohydrate are manufactured according to any of the methods mentioned above.

In accordance with another embodiment of the invention, a system for producing particles of aluminum chlorohydrate includes a feed stream configured to have a liquid solution of aluminum chloride, a conveyor belt having a surface configured to hold the liquid solution, a first radiant heat source configured to heat the liquid solution on the surface in order to form solid aluminum chloride hexahydrate, a grinder configured to crush the solid aluminum chloride hexahydrate in order to reduce an overall particle size of the aluminum chloride hexahydrate, and a second radiant heat source configured to heat the aluminum chloride hexahydrate in order to decompose the aluminum chloride hexahydrate and produce the particles of aluminum chlorohydrate.

In related embodiments, the first radiant heat source and/or the second radiant heat source may include one or more burners provided above and/or below the surface. The first radiant heat source and the second radiant heat source may be the same heat source. The system may further include a gas collector configured to collect gas emitted from the heated liquid solution and/or the heated aluminum chloride hexahydrate. The system may further include a heat recouperator configured to collect heat emitted from the heated solution and/or the heated aluminum chloride hexahydrate in order to recover the heat. The system may further include a reflector configured to return radiant energy to the surface reflected from the heated solution and/or the heated aluminum chloride hexahydrate in order to utilize the radiant energy generated.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Systems and methods for improving and simplifying the process for producing aluminum chlorohydrate are described herein. The system and process reduces the construction capital and operating costs while simultaneously simplifying the operation when compared to prior art. In addition, the product produced appears to have improved properties as a coagulant in the water treatment market than the product produced by the current method.

Figure 1:
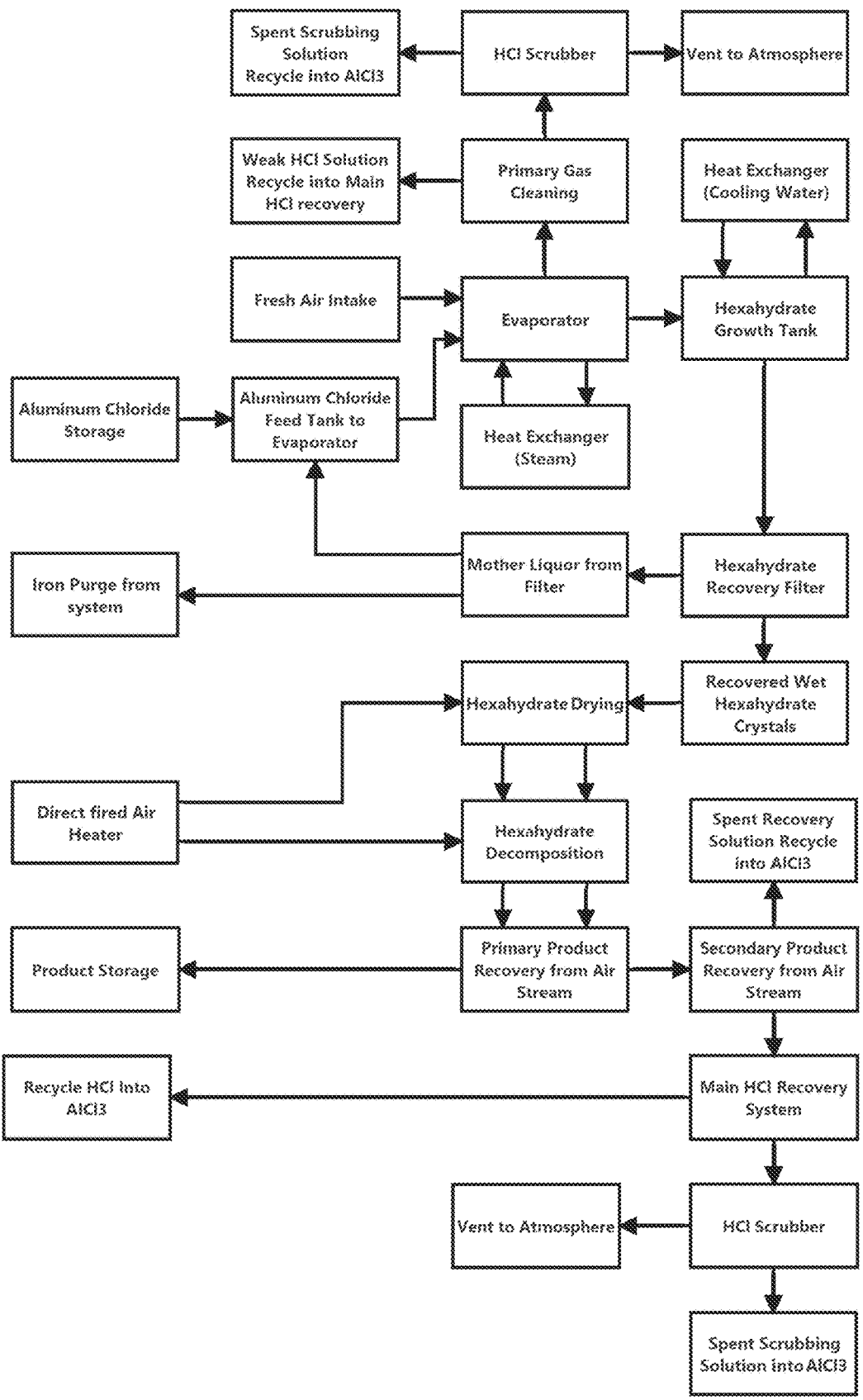
FIG. 1 is a flow diagram of a prior art process of producing particles of aluminum chlorohydrate.
Figure 2:
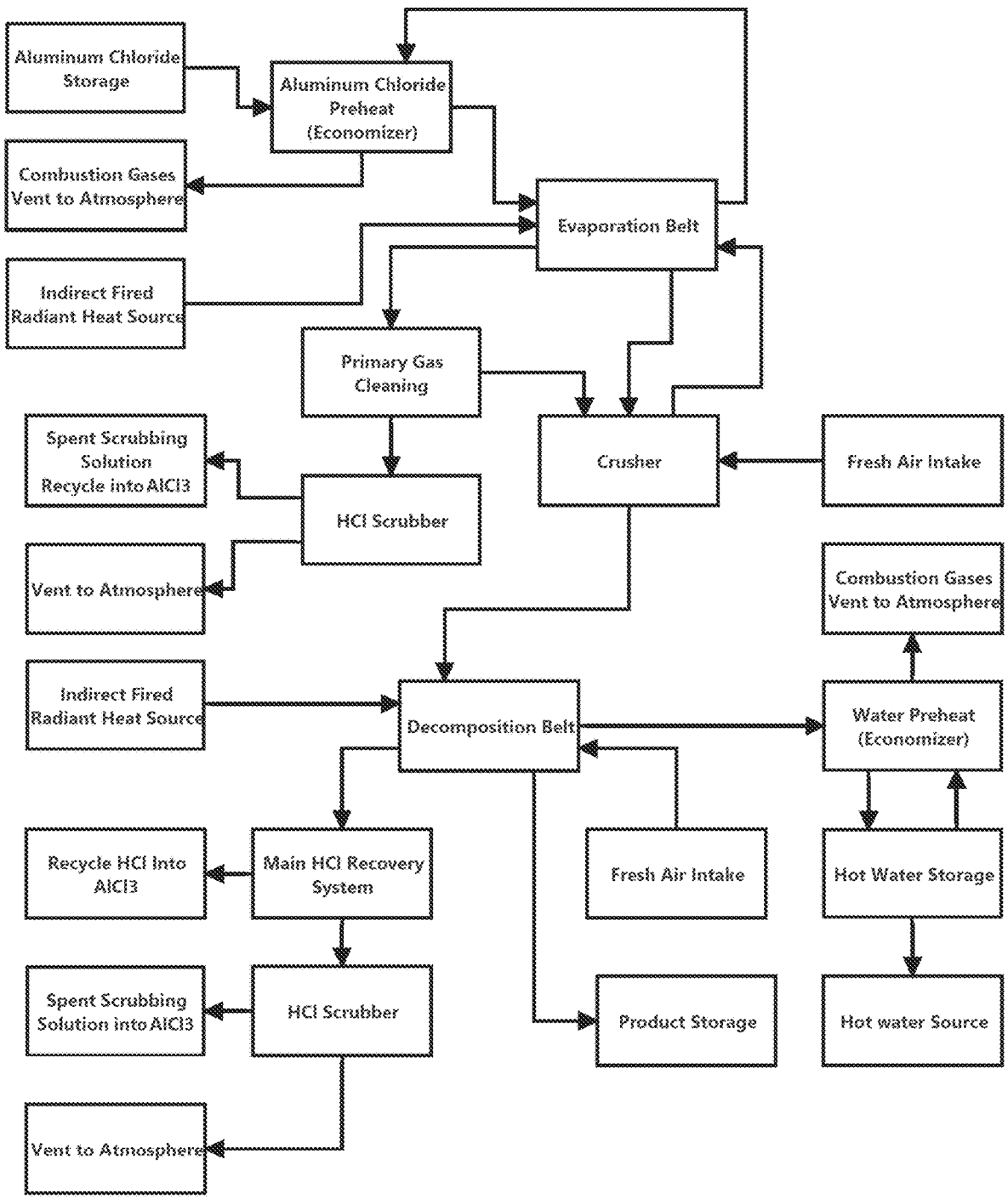
FIG. 2 is a flow diagram of a process of producing particles of aluminum chlorohydrate according to embodiments of the present invention.

FIG. 1 is a flow diagram of the prior art process and FIG. 2 is a flow diagram of a process of producing particles of aluminum chlorohydrate according to embodiments of the present invention. As shown, this new process greatly differs from the current, known multi-step process shown in FIG. 1 where the liquid aluminum chloride is first concentrated in an evaporator above its saturation point to produce crystals of aluminum chloride hexahydrate. These crystals then need to be recovered from the solution and go through a drying step to remove most of the free moisture. The damp crystals are next fed to a circular mill where they are thermally decomposed to form the final product. Without the predrying step, the feed to the circular mill will stick to the internal surfaces and plug the system.

In the new process, shown in FIG. 2, the aluminum chloride feed stock is taken directly from a liquid to the final dry product in a continuous processing step. This direct transformation eliminates the problems with the independent steps, sticking/plugging issues associated with the current method and significantly reduces the amount of air passing through the system. This reduction in air increases the concentration of HCl in the gas stream making it easier to recover and produce a strong acid for recycle. Additionally, the amount of air that needs to be scrubbed before returning to the environment is reduced.

Figure 3:
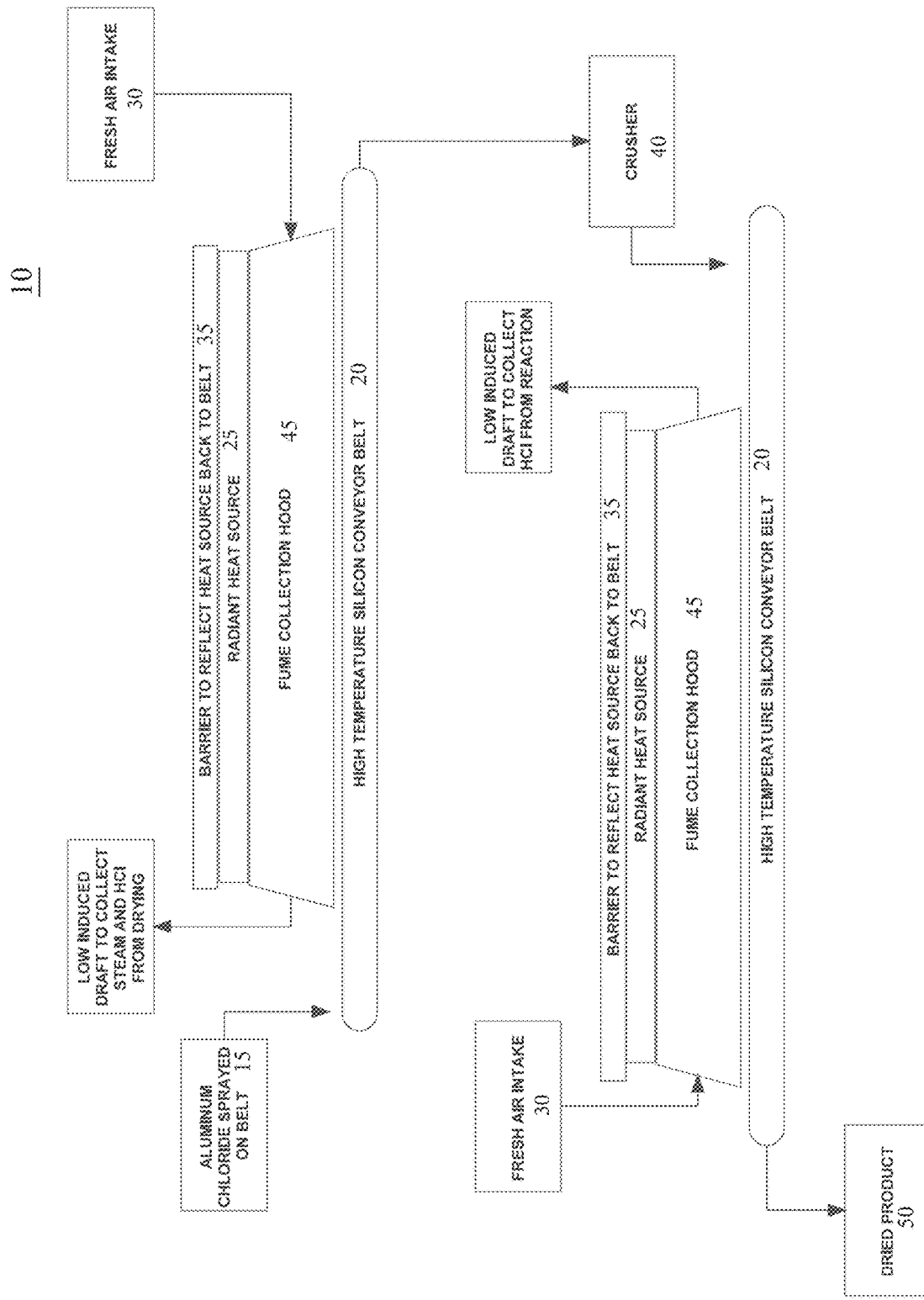
FIG. 3 is a schematic of an aluminum chlorohydrate system according to embodiments of the present invention.

FIG. 3 shows a schematic of an aluminum chlorohydrate system 10 according to embodiments of the present invention with the various upstream and downstream operations omitted for clarity. The system includes a source or feed stream 15 configured to have a liquid solution of aluminum chlorohydrate, a conveyor belt 20 having a surface configured to hold the aluminum chlorohydrate, a first radiant heat source 25 configured to heat the liquid aluminum chlorohydrate on the surface in order to form solid aluminum chloride hexahydrate, a grinder or crusher 40 configured to crush the solid aluminum chloride hexahydrate in order to reduce an overall particle size of the aluminum chloride hexahydrate, and a second radiant heat source 25 configured to heat the aluminum chloride hexahydrate in order to decompose the aluminum chloride hexahydrate and produce the particles of aluminum chlorohydrate. The first radiant heat source 25 and/or the second radiant heat source 25 may include one or more burners provided above and/or below the surface of the conveyor belt 20. The first radiant heat source 25 and/or the second radiant heat source 25 may be the same heat source. The system may further include a gas collector 45, e.g., fume hood, configured to collect gas emitted from the heated liquid solution and/or the heated aluminum chloride hexahydrate. The system may further include a reflector 35 configured to return radiant energy reflected from the heated solution and/or the heated aluminum chloride hexahydrate in order to fully utilized the radiant energy generated.

The energy required to operate this new system and process now comes from a radiant heat source 25 as opposed to the prior art method shown in FIG. 1 where both conductive and convective sources are used. By switching to a radiant source of heat the only purpose of the air intake 30 is to control dusting and fugitive HCl emissions around the equipment. Since the energy input from the radiant heat source 25 is also isolated from the process, it does not contain the decomposition gases. Being a clean source of combustion allows for the installation of heat recuperators (not shown) making the system more energy efficient. In the prior art system shown in FIG. 1, energy could be recovered, but the equipment would need to be made from exotic materials on both the process and service sides, making the equipment cost prohibitive.

Figure 4A:
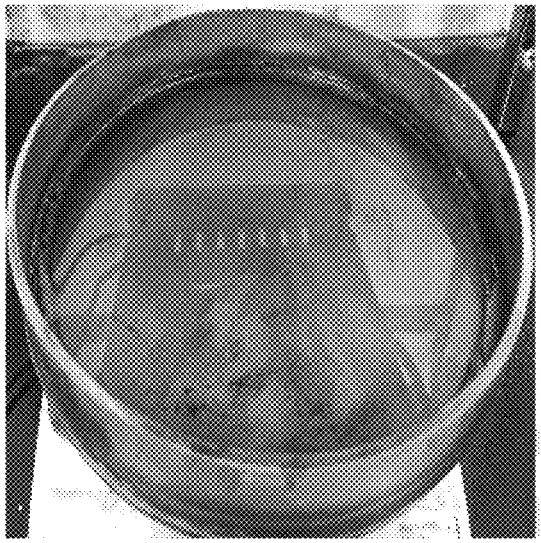
FIGS. 4A-4D are photographs of liquid aluminum chloride (FIG. 4A), aluminum chloride hexahydrate with irregular surface (FIG. 4B), aluminum chloride hexahydrate with flattened surface (FIG. 4C), and final dry product (FIG. 4D) produced at various stages of the production process according to embodiments of the present invention.
Figure 4B:
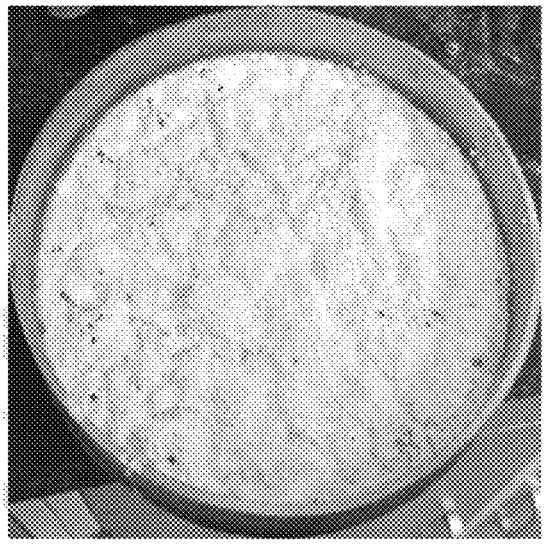
Figure 4C:
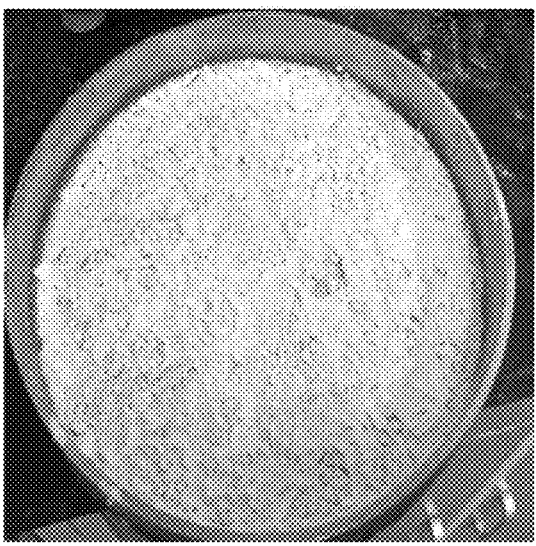
Figure 4D:
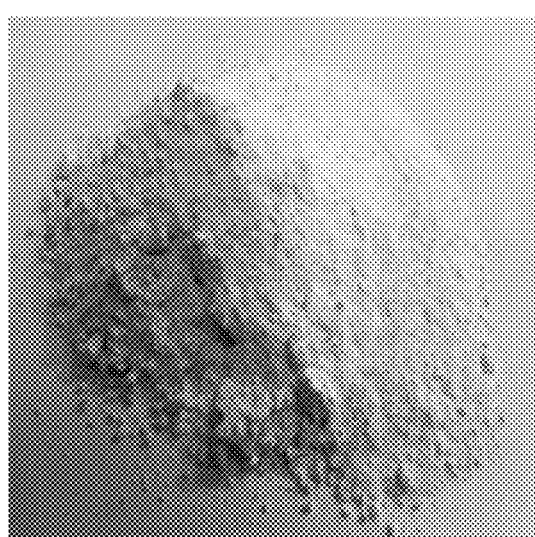

In embodiments of the present invention, the heating process still performs two separate functions, (1) drying the liquid aluminum chloride to the solid aluminum chloride hexahydrate and (2) allowing the decomposition of the hexahydrate to form the aluminum chlorohydrate. In embodiments of the present invention, these two processes are separated, which has several benefits. The first benefit is allowing for the separation of water vapor produced in the drying step from the high concentration HCl produced in the decomposition step. Separating the two sources facilitates the production of high quality HCl (greater than 30% by weight) for recycle to another portion of a plant. Next, in the transformation from liquid to solid, nearly 50 percent of the mass leaves the system as a vapor. Decoupling the drying from the decomposition allows for the consolidation of the dried solids into a deeper bed in the decomposition unit, allowing the sizing of the unit to be reduced or optimized. Finally, the production of hexahydrate by the method in the first part of the process produces a flake-like product that is in an irregular sheet that can range to over 1 inch tall. One of the factors in the absorbance of energy from a radiant heat source 25 is the distance from the receiving object to the heat source 25. The irregular surface of the flakes causes enough variance in the energy transfer to cause significant localized chemistry deviations in the final product. Separating the two processes allows for the insertion of a crushing unit 40 to make a more uniform feed to the decomposition step, thus minimizing these deviations. The prior art process shown in FIG. 1 produces a very fine product (<10 micron) that has handling and industrial hygiene issues. Embodiments of the present invention produce a coarser product that is easier to handle and poses a smaller particulate risk. FIG. 4A shows the liquid aluminum chloride, FIG. 4B shows the aluminum chloride hexahydrate with irregular surface, FIG. 4C shows the aluminum chloride hexahydrate with a flattened surface after going through the crusher 40, and FIG. 4D shows the final dry product 50.

EXAMPLES

Several tests to produce the particles of aluminum chlorohydrate were conducted. Samples were produced by placing a known weight of a known analysis aluminum chloride solution in a pan made of Hastelloy C-276. This pan was placed on a 5000-gram scale and exposed to radiant heat generated by a "Mr. Heater Portable Buddy 4,000/9,000 BTU" ceramic propane heater model MH9BX modified to operate in the horizontal position. The heater was equipped with a dual flow fuel valve that was nominally rated at high flow 9000 BTU per hour and low flow 4000 BTU per hour. The samples were mounted on adjustable rods so that the distance from the heating surface to the pan was adjustable.

As energy was transferred to the liquid, the water evaporated causing the scale weight to decrease. Knowing the starting weight and composition of the aluminum chloride, the ending weight that produced aluminum chloride hexahydrate was calculated.

As the aluminum chloride solution transitioned from a liquid to a solid, a layer of solid material formed on the surface of the liquid trapping the evaporating water. The steam trapped under the solid layer caused the solid layer to lift off the liquid surface. As the solid layer lifted, the layer stretched until it cracked and allowed the steam to vent sending the solid layer back down to the liquid surface. With each cycle of this, the thickness of the solid layer increased until the layer gained enough strength to support itself and not fall back into the liquid.

Figure 5:
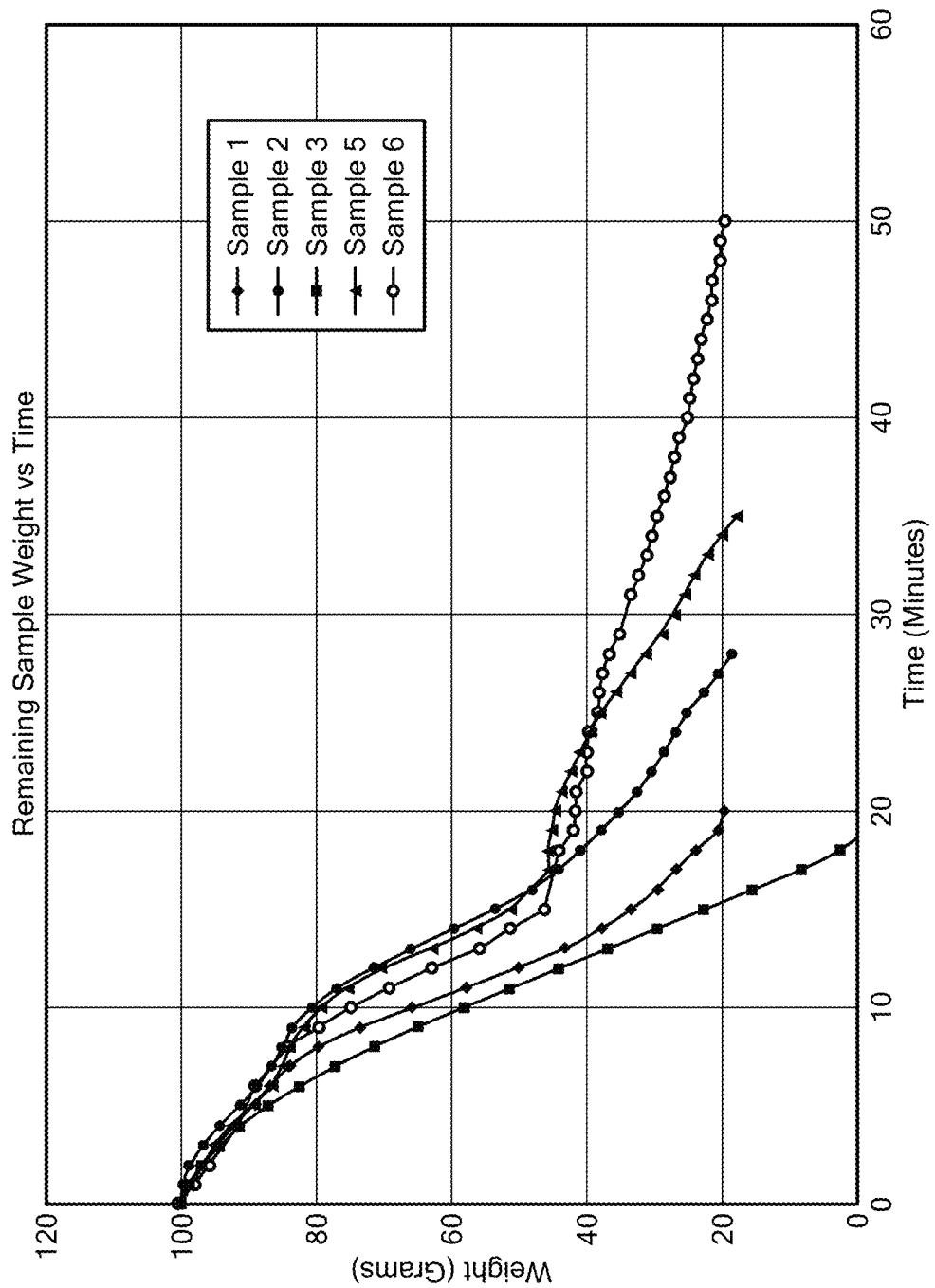
FIG. 5 is a graph showing the weight versus time for the five samples described in the Examples.

In initial tests described in Examples 1 and 2 below, the final product formed a cloudy solution when added to water and was hard to dissolve into the water. By varying the distance from the heat source, the mode by which the heat source was applied and adding an intermediate grinding step, the final product produced in Example 6 was able to form a clear solution when dissolved into water. Table 1, shown below, provides the parameters used for the Examples and FIG. 5 shows a graph of the weight versus time for the five samples.

Example 1

Sample 1-100.1 grams AlCl$_3$ heated full power non-stop to 19.7 grams with heat source 5.00 inches away. Hard to dissolve and made a cloudy solution.

Example 2

Sample 2-100.1 grams AlCl$_3$ heated full power non-stop to 18.6 grams with heat source 5.875 inches away. Product dissolves to a cloudy solution.

Example 3

Sample 3-100.2 grams RO Water (without any AlCl$_3$) heated full power until gone with heat source 5.875 inches away. Calculated heat absorbance 14.93 BTU/minute or 0.271 BTU/in$^2$/minute. Sample 3 was tested in order to determine how much energy from the radiant heat source was being effectively absorbed by the sample compared to the system. No product was produced.

Example 5

Sample 5-100.0 grams AlCl$_3$ heated full power till dry with heat source 5.875 inches away. Removed from heat and crushed to make more uniform distance from heat source to product. Returned to heat and continued at high power to 17.9 grams with heat source 5.875 inches away. Product dissolves to a hazy solution.

Example 6

Sample 6-100.5 grams AlCl$_3$ heated full power till dry with heat source 5.875 inches away. Removed from heat and crushed to make more uniform distance from heat source to product. Returned to heat and continued at low power to 19.5 grams with heat source 5.875 inches away. Product dissolved to a clear solution.

TABLE 1

|  | Sample 1 | Sample 2 | Sample 3 | Sample 5 | Sample 6 |
|---|---|---|---|---|---|
| S.G. Solution | 1.27 | 1.27 | 1 | 1.27 | 1.27 |
| Density | 10.588 | 10.588 | 8.337 | 10.588 | 10.588 |
| Film thickness | 0.0873 | 0.0873 | 0.1110 | 0.0872 | 0.0877 |
| Heat Distance | 5.000 | 5.875 | 5.875 | 5.875 | 5.875 |
| Lab Analysis | | | | | |
| % Al2O3 | 34.66% | 50.30% | 0.00% | 49.35% | 41.70% |
| % (OH) | 25.40% | 33.46% | 0.00% | 31.83% | 29.40% |
| % Cl | 33.23% | 25.73% | 0.00% | 24.83% | 27.96% |
| Calculated Basicity | | | | | |
| (OH) Basicity | 73.2% | 66.5% | 0.0% | 64.4% | 70.4% |
| Cl Basicity | 54.0% | 75.5% | 0.0% | 75.9% | 67.9% |

Although the Examples disclose specific parameters used, embodiments of the present invention may use various parameters in order to modify the final product. For example, for the hexahydrate production, temperature of the heating surface of the radiant source, distance from the radiant source to the product, and/or depth of the aluminum chloride solution so that unwanted by products are not formed on the surface of the hexahydrate facing the radiant source before all the water is evaporated may be varied. Similarly, for the hexahydrate decomposition, temperature of the heating surface of the radiant source, distance from the radiant source to the product, particle size for decomposition, and/or depth of the hexahydrate so that unwanted by products are not formed on the surface of the hexahydrate facing the radiant source before the desired decomposition is complete may be varied. In addition, the relationship between weight loss, percent basic and waters of hydration in the product verses radiant heat source temperature and distance from product may also be varied along with variances in reflected temperature, the extent of reaction, and the power needed.

Figure 6:
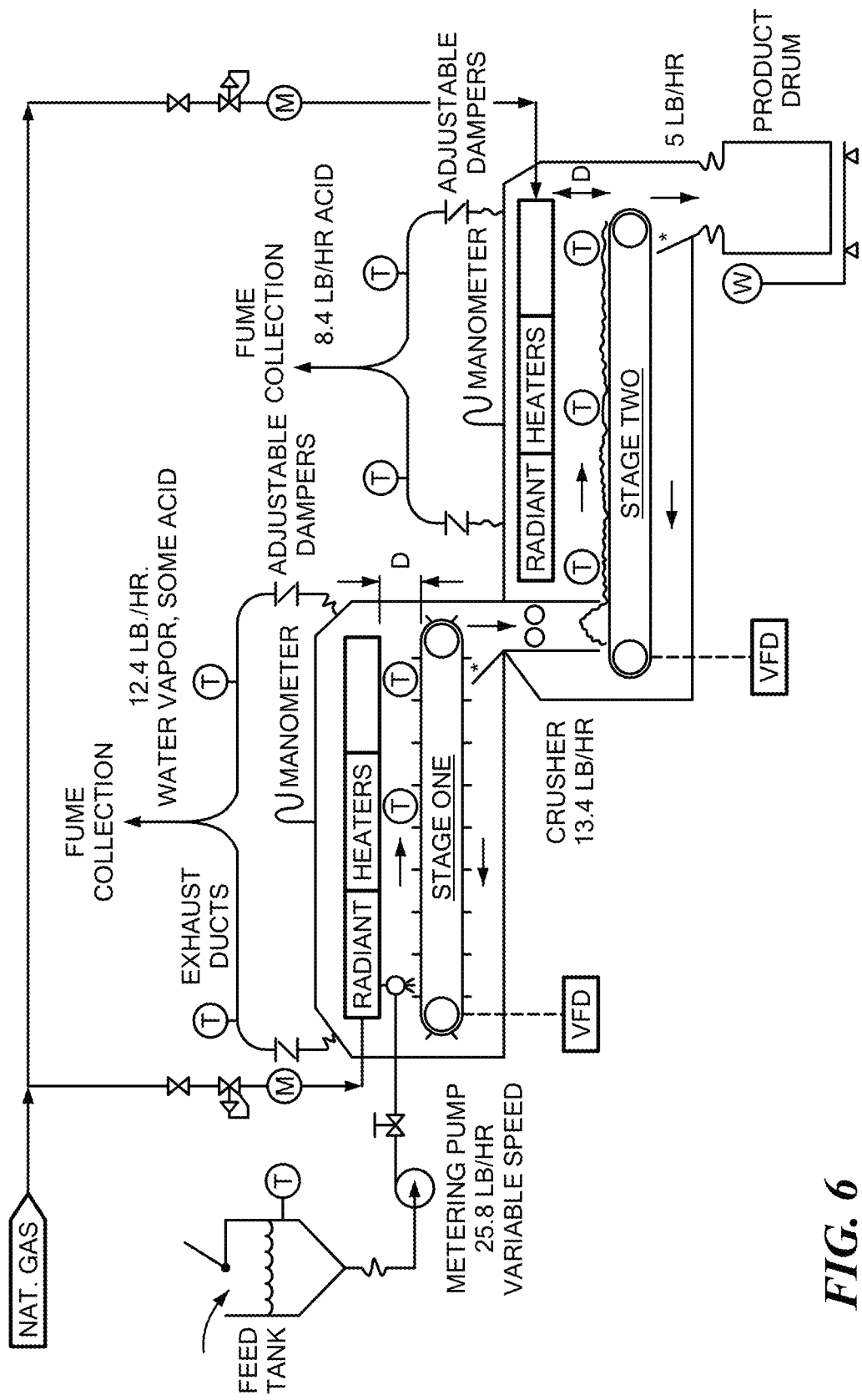
FIG. 6 is an exemplary aluminum chlorohydrate system according to embodiments of the present invention.

FIG. 6 shows an exemplary aluminum chlorohydrate system according to embodiments of the present invention, as described further below. The equipment specification is for a pilot plant, two-stage radiant belt-type dryer.

One embodiment of a two-stage pilot plant gas fired radiant dryer that heats a thin layer of liquid feedstock uniformly applied to a continuous moving belt, thereby converting it to a dry powdered product, is shown in FIG. 6.

This may be accomplished in two distinct and separate dryer stages. In stage 1 all free water is evaporated forming a dry crust of material using high intensity radiant heating. The crust may be easily broken and fed though a "crusher" before entering the stage 2 section of the dryer. In stage 2 the crushed material may be applied in a fairly uniform layer on the belt where lower intensity infrared heating converts it to the desired finished product.

The capacity of the system may be 5 lb./hr. of finished product at the discharge of stage 2.

Working examples indicate the conversion of feedstock to product is a yield of about 19.4%, so this may require a first stage feed rate of 25.8 lb./hr. Approximately 48% of the feed liquid may evaporate in the first stage, so the second stage feed rate may be about 13.4 lb./hr.

The liquid feed is a clear free flowing liquid containing soluble salts, preferably having a density=10.6 lb./gal and a low viscosity similar to water.

The final product is a powdered solid, having a density=18-20 lb./cf.

Discharge from first stage is a solid having no free water so that it can be crushed prior to second stage.

Working examples indicate the bed in the first stage is typically about 230-250 F when exposed to high intensity radiant heat for about 15 minutes while the free water evaporates from the thin film of material. The initial thickness of the liquid layer of feed in these studies was approximately 0.09". The material bed in the second stage is at a higher temperature of about 350-450 F and is exposed to lower intensity radiant heat for about 35 minutes during the decomposition step.

Control of off gases and dust require the dryers to have enclosed hoods which may be connected to existing plant system. The hoods may be provided with adjustable dampers and manometers for controlling the hood vacuum. Off gas from the first stage is primarily water vapor containing some HCl; off gases from the second stage is primarily HCl. The gases may be vented to existing collection system(s) under a controlled low vacuum, e.g., on the order of a couple of inches of water, to prevent emissions of vapor and dust into the workspace. As long as the HCl remains in the vapor state, stainless steel may be used as an acceptable material of construction.

This drying system may be used to perform experiments in order to determine design of a future full-size plant system, therefore the systems key process variables must be capable of being changed and measured, such as: Feed rate, Belt speed, Radiant heater temperatures, Distance between radiant element and the belt, and Hood draft.

In addition, other variables may need to be monitored, such as Feed temperature, Fuel gas consumption, Material temperature while drying, Off gas temperatures near the inlet and exit of each bed.

Other desirable features of the dryer may be:

The materials of construction must resist HCl corrosion and withstand high temperatures. Preferably, multiple sight ports along each dryer, multiple emergency stop push button, and high temperature shutdown may be included.

Although the above discussion discloses various exemplary embodiments, those skilled in the art may make various modifications to, or variations of, the illustrated embodiments without departing from the inventive concepts disclosed herein.

What is claimed is:

1. A method of producing particles of aluminum chlorohydrate, the method comprising:
    providing a liquid solution of aluminum chloride onto a surface;
    heating the liquid solution with a first radiant heat source in order to dry the aluminum chloride, so that solid aluminum chloride hexahydrate is formed;
    crushing the solid aluminum chloride hexahydrate in order to reduce an overall particle size of the aluminum chloride hexahydrate; and
    heating the aluminum chloride hexahydrate with a second radiate heat source in order to decompose the aluminum chloride hexahydrate to produce the particles of aluminum chlorohydrate.

2. The method according to claim 1, wherein providing the liquid solution includes spraying the liquid solution onto a conveyor belt.

3. The method according to claim 1, wherein the first radiant heat source and/or the second radiant heat source includes one or more burners provided above and/or below the surface.

4. The method according to claim 3, wherein the first radiant heat source and/or the second radiant heat source is provided about 5 inches to about 5.875 inches from the surface.

5. The method according to claim 1, wherein the first radiant heat source and/or the second radiant heat source heats the surface.

6. The method according to claim 1, wherein the first radiant heat source and the second radiant heat source are the same heat source.

7. The method according to claim 1, further comprising:
    collecting gas emitted from the heated liquid solution and/or the heated aluminum chloride hexahydrate.

8. The method according to claim 7, wherein the gas includes steam and/or hydrochloric acid released from the heated solution and/or the heated aluminum chloride hexahydrate.

9. The method according to claim 1, further comprising:
    collecting heat emitted from the heated solution and/or the heated aluminum chloride hexahydrate in order to recover the heat.

10. A system for producing particles of aluminum chlorohydrate, the system comprising:
    a feed stream configured to have a liquid solution of aluminum chloride;
    a conveyor belt having a surface configured to hold the liquid solution;
    a first radiant heat source configured to heat the liquid solution on the surface in order to form solid aluminum chloride hexahydrate;
    a grinder configured to crush the solid aluminum chloride hexahydrate in order to reduce an overall particle size of the aluminum chloride hexahydrate; and
    a second radiant heat source configured to heat the aluminum chloride hexahydrate in order to decompose the aluminum chloride hexahydrate and produce the particles of aluminum chlorohydrate.

11. The system according to claim 10, wherein the first radiant heat source and/or the second radiant heat source includes one or more burners provided above and/or below the surface.

12. The system according to claim 11, wherein the first radiant heat source and the second radiant heat source are the same heat source.

13. The system according to claim 10, further comprising:
    a gas collector configured to collect gas emitted from the heated liquid solution and/or the heated aluminum chloride hexahydrate.

14. The system according to claim 10, further comprising:
    a heat recouperator configured to collect heat emitted from the heated solution and/or the heated aluminum chloride hexahydrate in order to recover the heat.

15. The system according to claim 10, further comprising:
    a reflector configured to return radiant energy to the surface reflected from the heated solution and/or the heated aluminum chloride hexahydrate in order to utilize the radiant energy generated.

* * * * *